United States Patent [19]

Stierberger

[11] Patent Number: 4,841,406
[45] Date of Patent: Jun. 20, 1989

[54] X-RADIATION PROTECTION CIRCUIT

[75] Inventor: Willy F. Stierberger, Knoxville, Tenn.

[73] Assignee: North American Philips Consumer Electronics Corp., Knoxville, Tenn.

[21] Appl. No.: 101,878

[22] Filed: Sep. 28, 1987

[51] Int. Cl.⁴ .................................................. H02H 3/20
[52] U.S. Cl. ...................................... 361/91; 358/243; 315/411
[58] Field of Search .................... 361/56, 86, 88, 91; 358/243; 315/411

[56] References Cited

U.S. PATENT DOCUMENTS

| | | | |
|---|---|---|---|
| 4,047,078 | 9/1977 | Meehan | 315/411 |
| 4,126,816 | 11/1978 | Willis | 315/411 |
| 4,234,829 | 11/1980 | Willis | 315/411 |
| 4,287,535 | 9/1981 | Vakil | 358/243 |
| 4,335,335 | 6/1982 | Willis | 315/411 |
| 4,343,028 | 8/1982 | Hicks | 361/91 |
| 4,345,275 | 8/1982 | Waybright | 358/243 |
| 4,414,578 | 11/1983 | Takeichi | 358/243 |
| 4,441,137 | 4/1984 | Harwood | 361/91 |
| 4,516,168 | 5/1985 | Hicks | 361/91 X |
| 4,524,411 | 6/1985 | Willis | 363/21 |
| 4,546,388 | 10/1985 | Williams, Jr. | 358/190 |
| 4,562,508 | 12/1985 | Chen et al. | 361/91 |
| 4,641,064 | 2/1987 | Testin et al. | 315/411 |
| 4,719,530 | 1/1988 | Berdaros | 361/91 X |

Primary Examiner—Derek S. Jennings
Attorney, Agent, or Firm—Marianne R. Rich

[57] ABSTRACT

An X-radiation protection circuit in a television receiver is responsive to both high voltage and high beam current conditions. A first detector is interconnected with an electron beam power source and monitors the beam current therefrom. The first detector produces a first voltage proportional in magnitude to the electron beam current. A second detector monitors a high voltage transformer that produces a potential for operating on the electron beam and the second detector produces a second voltage that is proportional in magnitude to the high voltage potential. A monitoring circuit constantly monitors both the first and second voltages and produces a trigger signal whenever the additive sum of the first and second voltages exceeds a selected magnitude. In this manner, a trigger signal indicates an excessively high combination of electron beam current and high voltage. This circuit is constantly responsive to both high voltage and electron beam current. In addition, a hold down circuit operates independently of the first and second detectors to produce the trigger signal whenever the high voltage potential exceeds a predetermined magnitude.

8 Claims, 1 Drawing Sheet

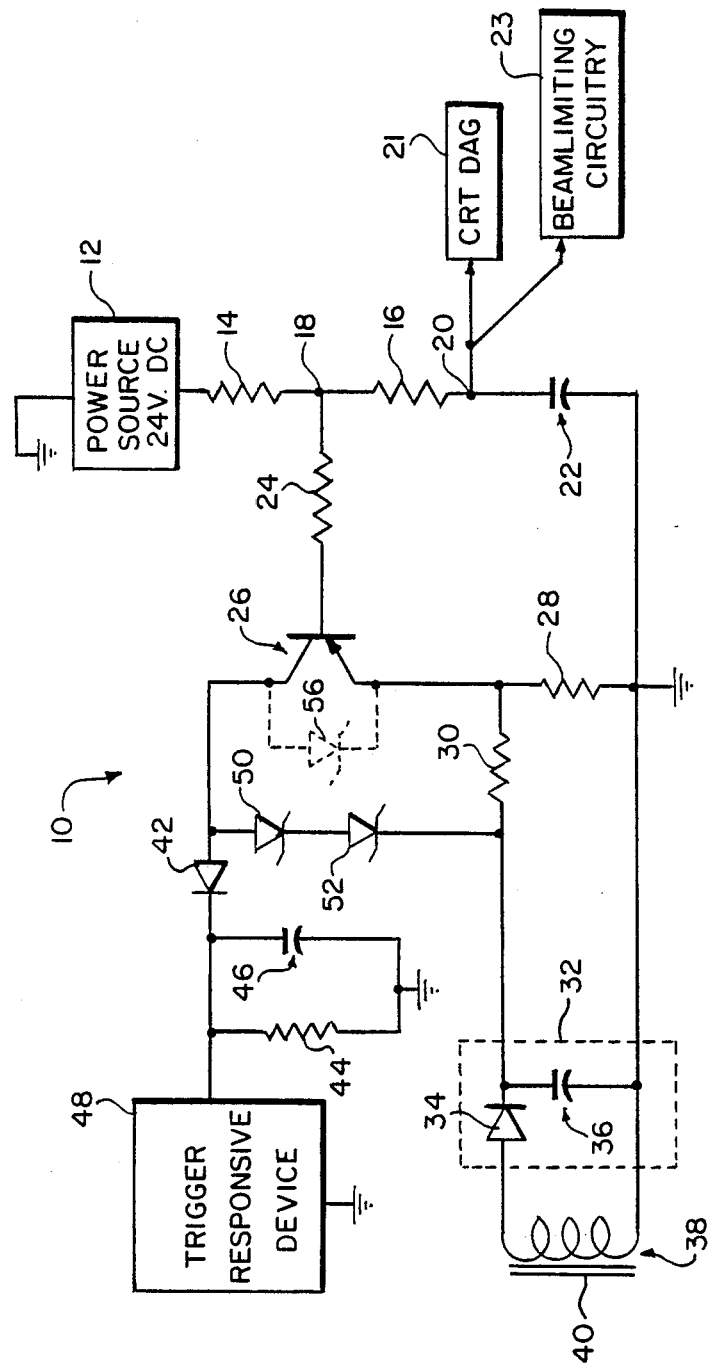

X-RADIATION PROTECTION CIRCUIT

FIELD OF INVENTION

The present invention relates to X-radiation protection systems in a television receiver and in particular relates to a protection circuit that is constantly responsive to both high voltage and electron beam current in the television receiver.

BACKGROUND OF INVENTION

In many modern televisions, a high voltage accelerator potential is developed by a flyback transformer for accelerating an electron beam in a cathode-ray tube. This potential is generally referred to as the high voltage and will be on the order of 25 to 30 kilovolts for most color televisions. Screen brightness is proportional to the electron beam intensity (electron beam current) which is generally proportional to the high voltage. Thus, to increase screen brightness as might be desired, one must increase the high voltage and beam current. However, a television receiver is designed to operate at a particular high voltage and beam current, and exceeding such design criteria may cause the production of X-radiation.

While the electron beam current is generally proportional to the high voltage, the actual relationship between these two parameters varies depending upon operating conditions of the receiver. Also, while the production of X-radiation is generally associated with excessive high voltage, in fact, the production of X-radiation is affected by a combination of both high voltage and beam current. In general, as the beam current is lowered, a greater high voltage is allowable without producing harmful amounts of X-radiation.

To protect against the production of X-radiation, protective circuitry is commonly used to disable the television when favorable conditions exist for the production of X-radiation. Early designs of such protective circuitry simply monitored the high voltage and disabled the television set whenever a threshold was exceeded. In this configuration the design of the protection circuit must assume a worst case electron beam current and, thus, the threshold must be set lower than necessary for most beam currents. This design requirement often resulted in an unnecessary disablement of the television set when the magnitude of the high voltage went high, but the electron beam current remained sufficiently low to negate any danger of X-radiation production.

Various protection circuits have been designed to avoid so called nuisance shutoffs during periods where low electron beam current negates the potential of producing X-radiation. For example, Willis in U.S. Pat. No. 4,126,816 discloses a circuit that monitors only high voltage during normal operating conditions. However, at a predetermined low beam current, a second circuit imposes a new bias on the protective circuit which raises the magnitude of the high voltage required to trigger protection of the television set. In essence, Willis discloses a high voltage monitor or protection circuit that operates in two modes: a low beam current mode and a high beam current mode. However, this monitor is not fully responsive to beam current since the monitor is decoupled from the beam current circuit except during periods of low beam current. If a malfunction occurred which caused a very high beam current with the magnitude of the high voltage remaining normal, this circuit would not respond to the extremely high beam current and would not trigger protection.

Another example of a high voltage protection circuit is disclosed in U.S. Pat. No. 4,287,535 to Vakil in which high voltage is monitored and a latch circuit is triggered when the high voltage magnitude is considered excessive. Vakil monitors a high voltage horizontal sweep transformer and connected to the transformer are a rectifier circuit and a Zener diode circuit. So long as the high voltage is below a predetermined threshold, the Zener diode decouples the latch circuit from the sweep transformer and rectifier circuit. However, when the high voltage exceeds the first threshold, the Zener diode breaks down and the latch circuit is coupled to the rectified voltage from the transformer. However, the latch circuit is not necessarily actuated by the aforementioned coupling. Instead, the current flow from the transformer through the rectifier and latch circuit must exceed a second threshold before the latch circuit will be actuated. This second threshold is variable depending upon input from a feedback circuit that is also connected to the high voltage sweep transformer and the cathode-ray tube anode. According to the patent, the second threshold is proportional in magnitude to the beam current. Thus, according to the patent, once the first and second thresholds have been exceeded, in that order, the latch circuit is permanently triggered. Regardless of the magnitude of the high voltage or the electron beam current, the latch will remain triggered until the television is turned off. Again, Vakil is not fully monitoring beam current since the high voltage monitor is decoupled from the latch except during periods when the magnitude of the high voltage exceeds the first threshold.

The above circuits are but two examples of numerous protection circuits for television receivers designed to protect against X-radiation. Many others exists but they are generally more complicated and expensive than necessary. Also, because to their complexity, they have an excessive number of failure modes. Finally, many of the protective circuits have been out moded or obsoleted by changes in television design. For example, many televisions no longer use a horizontal sweep transformer which was the signal source in the Vakil patent.

SUMMARY OF INVENTION

In accordance with the present invention, a protection circuit is provided for a television that constantly monitors both beam current and high voltage. A threshold curve is established for the combination of these two parameters, and if the combination of a beam current and high voltage exceeds the threshold a trigger signal is produced.

This protection circuit is used in a television having a cathode-ray tube producing an electron beam. In the television, a high voltage transformer provides a high voltage potential that operates on the electron beam, and an electron beam power source provides an electron beam current to the tube. The protection circuit includes a first detector that is interconnected with the electron beam power source which monitors the electron beam current from the source. This first detector produces a first voltage that is proportional in magnitude to the electron beam current. A second detector monitors the high voltage transformer and produces a second voltage proportional in magnitude to the high voltage potential. A monitoring circuit constantly monitors both the first and second voltages and produces a trigger signal when the additive sum of said first and second voltages exceeds a selected magnitude. In this configuration, a trigger signal indicates an excessively high combination of electron beam current and high voltage potential.

In accordance with another aspect of the present invention, a hold down circuit is provided for independently generating the trigger signal in response only to the high voltage potential whenever the potential exceeds a predetermined magnitude. In this manner, the trigger signal is also generated from the high voltage potential totally independently of the electron beam current, but at all times both beam current and high voltage are monitored by the first and second detectors.

BRIEF DESCRIPTION OF THE DRAWING

The present invention may best be understood by reference to the following Detailed Description of a preferred embodiment when considered in conjunction with the drawing in which there is shown a circuit diagram of the protection circuit.

DETAILED DESCRIPTION

Referring now to the drawing, a protection circuit 10 includes circuitry for monitoring both the beam current and the high voltage of a television. The protection circuit 10 includes a power source 12 whose output is connected to resistors 14 and 16 that are connected in series through a junction 18 to another junction 20. At the junction 20, resistor 16 is connected to the cathode-ray tube DAG 21 which is a conductive coating on the outside of the tube. Junction 20 is also connected to the standard beamlimiting circuitry 23 of the television set and is connected through a capacitor 22 to ground.

The beam current of the cathode-ray tube passes entirely through the power source 12, the resistors 14 and 16 and through the junction 20. In conventional television sets, the beamlimiting circuitry 23 uses a resistor to provide it with a timing constant. As shown in the drawing, the resistors 14 and 16 are performing the function of the single resistor needed by the beamlimiting circuitry 23 to provide its timing constant. However, for purposes of the present circuit, the needed single resistor has been broken into a pair of series connected resistors, namely resistors 14 and 16. Since the beam current must pass entirely through resistor 14 there will be a voltage drop from the power source across the resistor 14 that is proportional to the beam current. As the beam current increases, the voltage drop across the resistor 14 increases and the voltage appearing at junction 18 will decrease with increasing beam current.

The voltage at junction 18 is applied through a resistor 24 to the base a PNP transistor 26. The emitter of the transistor 26 is connected to ground through a resistor 28 and is connected through resistor 30 to a rectifier circuit 32 which consists of a diode 34 and a capacitor 36. The rectifier circuit 32 receives power from coil 38 that consist of about 1 to 3 turns on a flyback transformer 40. The flyback transformer 40 is the transformer that provides the accelerating high voltage potential for the electron beam of the cathode-ray tube. The voltage produced by the coil 38 will be an alternating current in the form of spikes as are conventionally produced by flyback transformers in televisions. This alternating current is applied to the rectifier current 32 which will produce a DC voltage that is proportional in magnitude to the AC voltage produced by the coil 38. Thus, the magnitude of the voltage of rectifier 32 is proportional in magnitude to the high voltage alternating current produced by the flyback transformer 40. The DC voltage of the rectifier circuit 32 is applied through resistors 30 and 28 which function as a voltage divider and, thus, the voltage appearing at the emitter of the transistor 26 will be proportional to the magnitude of the high voltage on the flyback transformer 40.

It is desired to apply a voltage to the emitter of transistor 26 that is proportional to the high voltage, and the function of resistors 30 and 28 is to appropriately scale the voltage applied to the emitter. In like manner, the design criteria in choosing the size of resistor 14 was to produce a voltage of appropriate scale at junction 18 that is proportional in magnitude to the beam current, and the design criteria for choosing resistor 16 is to provide a time constant to the beam limiting circuitry. That is, the series resistance of resistors 14 and 16 is chosen to provide an appropriate resistance for the beamlimiting circuitry 23.

The collector of transistor 26 is connected through a diode 42 and a resistor 44 to ground. A capacitor 46 is also connected between the diode 42 and ground. A trigger responsive device 48 is connected to the resistor 44 so that the voltage appearing across resistor 44 provides an input to device 48. When a voltage does appear across the resistor 44, this is the trigger signal and the trigger responsive device 48 will respond to such trigger signal and protect the television in a conventional manner. For example, the trigger responsive device 48 may disable the power supply for the entire television set.

A pair Zener diodes 50 and 52 are connected in a reverse bias direction between the output of the rectifier circuit 32 and the diode 42. Thus a series connection is formed by the output of the rectifier 32, the Zener diodes 50 and 52, the diode 42 and the resistor 44.

The function of diode 42 is for protection and capacitors 22 and 46 function as filters for high frequency components that may appear on the circuit.

OPERATION

In operation, the circuit 10 constantly monitors both the beam current and the high voltage and produces a trigger signal in response to a combination thereof. As previously mentioned, the voltage applied to the base of transistor 26 is proportional in magnitude to the magnitude of the beam current. Also, the voltage applied to the emitter of transistor 26 is proportional to the magnitude of the high voltage on the flyback transformer 40. As long as the television is operating within normal magnitudes of high voltage and beam current, the circuit is designed so that the voltage on the base of transistor 26 is significantly greater than the voltage on the emitter of transistor 26 to prevent the transistor 26 from turning on. Under these conditions, no current flows through transistor 26, and thus no voltage drop is produced across resistor 44. Therefore, the input to the trigger responsive device 48 is zero volts or ground (common). The relative magnitudes of the voltages appearing on the base and emitter of transistor 26 are controlled by resistors 14, 28 and 30 so that the transistor 26 will not turn on during normal operations of the television with beam current and high voltage falling within safe ranges.

However, if the beam current begins to rise, the voltage drop across resistor 14 will increase, and the voltage applied to the base of resistor 26 will decrease. If the high voltage magnitude remains constant and the beam current continues to increase, eventually the voltage appearing at the base of transistor 26 will drop below Veb of the transistor (approximately 0.6 volts) and the transistor turns on. When the transistor 26 turns on, current will flow from the rectifier circuit 32, through resistor 30, through transistor 26, through diode 42 and through resistor 44 to ground. This current flow will cause a voltage drop across the resistor 44 creating a trigger signal for the device 48 and a shutoff will occur.

In like manner, the circuit is responsive to increases in magnitude of the high voltage. If the magnitude of the high voltage on the flyback transformer 40 began to increase, the output of the rectifier circuit 32 would increase, and after the voltage division produce by resistors 30 and 28, the voltage appearing at the emitter of the transistor 26 would likewise increase. If the beam current remains constant and the magnitude of the high voltage continues to rise, the voltage appearing at the emitter of transistor 26 will eventually rise until it approaches the voltage appearing at the base of transistor 26. When the emitter/base voltage drops below approximately 0.6 volts the transistor will again turn on and a current will flow through resistor 44 providing a trigger signal to the device 48.

From the discussion above, it will be appreciated that the protection circuit 10 will turn on and create a trigger signal in response to an infinite number of combinations of beam current and high voltage magnitude. When the sum of the voltages appearing at the base and emitter of transistor 26 exceed a predetermined threshold, the transistor will turn on and a trigger signal will be produced.

The Zener diodes 50 and 52 provide a hold down function and these diodes in combination with the components with which they function may be considered as a hold down circuit. Basically, the Zener diodes 50 and 52 provide for a shutoff whenever the magnitude of the high voltage exceeds a predetermined amount regardless of the beam current magnitude. As the high voltage magnitude begins to rise, the magnitude at the output of the rectifier circuit 32 will also rise. Eventually, the magnitude of the voltage produced by the rectifier circuit 32 will exceed the breakdown voltages of the Zener diodes 50 and 52, and a current will flow from the rectifier 32, through the Zener diodes 50 and 52, through diode 42 and through resistor 44 to ground. When the Zener diodes 50 and 52 breakdown, a voltage is produced across resistor 44 and a trigger signal is provided to the device 48. The purpose of the hold down circuit 50 and 52 is to provide a high voltage magnitude that may never be exceeded. It should be noted that the Zener diodes 50 and 52 are inserted into the circuit without any resistors between the diodes and the coils 38. Thus, the voltages sensed by the Zener diodes 50 and 52 are not subject to errors that might be created by a voltage division circuit, and since so few components are disposed between the diodes 50 and 52 and the coil 38, the number of failure modes is minimized.

In the preferred embodiment, the resistors 14, 28 and 30 are chosen so that the hold down circuit is basically a redundant circuit that would provide an alternate shutdown in the event that the transistor 26 or the components operating in association with transistor 26 failed. However, it should be appreciated that the circuit 10 could be designed so that the hold down circuit provided by Zener diodes 50 and 52 would dominate under certain operating conditions. For example, the circuit 10 could be designed so that the protection function is provided by the transistor 26 whenever beam currents and high voltage magnitudes are within normal operating ranges. But, if the beam current drops to an abnormally low magnitude, the circuit 10 could be designed so that the Zener diodes 50 and 52 would break down before transistor 26 turned on.

In an alternate embodiment, a Zener diode 56 could be placed across transistor 26 as shown in dashed lines in the drawing. The Zener diode 56 is not normally present, but if it were, it would protect against the possibility of a failure of transistor 26. The Zener diode 56 would function similarly to diodes 50 and 52, except that the voltage applied to it would be controlled by the voltage division circuit formed by the resistors 30 and 28. This voltage would be proportional to the high voltage on the flyback transistor 40, but it is not the preferred embodiment since diode 56 would be subject to the effects of the tolerances in the magnitudes of resistors 28 and 30. In most circuits of this type, the resistors will have a tolerance of plus or minus five percent.

Although preferred embodiments have been described in the foregoing Detailed Description, it will be understood that the invention is capable of numerous rearrangements, modifications and substitutions of parts without departing from the scope of the invention as defined by the appended claims.

What is claimed is:

1. In a television having a cathode-ray tube producing an electron beam, a high voltage transformer for providing a high voltage potential, and an electron beam power source for providing an electron beam current to the tube, a protective circuit comprising:
   first detector means interconnected with the electron beam power source for monitoring the electron beam current therefrom and for continuously producing a first voltage proportional in magnitude to the electron beam current;
   second detector means interconnected with the high voltage transformer for monitoring the high voltage transformer therefrom and for continuously producing a second voltage proportional in magnitude to the high voltage potential; and
   a monitoring circuit constantly receiving the first and second voltages for constantly monitoring the additive sum of the first and second voltages and for producing a trigger signal when the additive sum of said first and second voltages exceeds a selected magnitude, whereby a trigger signal indicates an excessively high combination of electron beam current and high voltage potential.

2. The protective circuit of claim 1 further comprising a hold down circuit for generating the trigger signal in response only to the high voltage potential whenever the potential exceeds a predetermined magnitude, whereby the trigger signal is also selectively generated in response to the high voltage potential independently of the electron beam current 3. The protective circuit of claim 2 wherein said hold down circuit comprises:
   a winding on the high voltage transformer having first and second leads;
   a rectifier circuit connected to said first and second leads of said winding for producing a rectified winding voltage;

at least one Zener diode connected in a reverse bias direction to said rectifier circuit;

at least one resistor connected to the Zener diode and the rectifier circuit so that the resistor and the Zener diode are connected in a series across the rectified winding voltage, the voltage appearing across said resistor comprising the trigger signal, whereby a trigger signal is produced whenever the rectified voltage of said winding exceeds the breakdown threshold of said Zener diode.

4. The protective circuit of claim 1 wherein said first detector means comprise:

a resistor connected between said electron beam power source and the tube, the voltage of the power source less the voltage across said resistor comprising the first voltage.

5. The protective circuit of claim 1 wherein said second detector means comprises:

a winding on the high voltage transformer;

a rectifier circuit connected across said winding for providing a rectified winding voltage;

first and second resistor means connected across said rectifier winding voltage and functioning as a voltage dividing circuit, the voltage appearing at the junction between said first and second resistor means comprising the second voltage of said second detector means.

6. In a television having a cathode-ray tube producing an electron beam, a high voltage transformer for providing a high voltage potential, and an electron beam power source for providing an electron beam current to the tube, a protective circuit comprising:

first detector means interconnected with the electron beam power source for monitoring the electron beam current therefrom and for producing a first voltage proportional in magnitude to the electron beam current;

second detector means for monitoring the high voltage transformer and producing a second voltage proportional in magnitude to the high voltage potential;

a monitoring circuit for constantly monitoring the first and second voltages and for producing a trigger signal when the additive sum of said first and second voltages exceeds a selected magnitude, whereby a trigger signal indicates an excessively high combination of electron beam current and high voltage potential;

said monitoring circuit further comprising:

a transistor having a base connecting to said first detector means, having an emitter connected to said second detector means and having a collector, the first voltage being applied to the base and the second voltage being applied to the emitter;

at least one resistor means connected between the collector of said transistor and ground; and said transistor being operable to conduct when the sum of the first and second voltages equal or exceed a predetermined amount and, when conducting, said transistor being operable to apply the second voltage across said at least one resistor means and produce a voltage drop across said resistor means which comprises the trigger signal.

7. In a television having a cathode-ray tube producing an electron beam, a high voltage transformer for providing a high voltage potential for operating on the electron beam, a ground, and an electron beam power source for providing an electron beam current to the tube, a protective circuit comprising:

first and second resistors connected together at a first junction and forming a series connection between the electron beam power source and tube, said first and second resistors being operable to carry the electron beam current which produces a first voltage at the first junction of said first and second resistors;

a transistor having an emitter, base and collector, the base being connected to the first junction between said first and second resistors;

a winding disposed on said high voltage transformer for producing an a.c. winding voltage corresponding in magnitude to the high voltage potential of said high voltage transformer;

a rectifier circuit connected across said winding for rectifying the a.c. winding voltage to produce a rectified winding voltage corresponding in magnitude to the a.c. winding voltage;

third and forth resistors connected together at a second junction and forming a series connection between said rectifier circuit and ground so that said rectified winding voltage causes a current flow through said third and fort resistors and creates a voltage at the second junction;

means for connecting said second junction to the emitter of said transistor to apply the voltage at the second junction to said emitter;

at least a fifth resistor connected between the collector of said transistor and ground. The voltage appearing across said fifth resistor comprising a trigger signal; and said transistor being operable to conduct when the sum of voltages at said first and second junctions equals or exceeds a predetermined amount and, when conducting, the transistor being operable to apply the voltage at said second junction across said fifth resistor to create a voltage drop across said fifth resistor, whereby a trigger signal is generated when said transistor conducts.

8. The protective circuit of claim 7 further comprising at least one Zener diode connected in a reverse bias direction between the rectifier circuit and the fifth resistor to form a series connection from the rectifier circuit through the Zener diode and then through the fifth resistor to ground, whereby the rectified voltage will be applied across the fifth resistor whenever the rectified voltage exceeds the breakdown voltage of the Zener diode, the voltage appearing across the fifth resistor comprising a trigger signal.

* * * * *